United States Patent Office
3,606,567
Patented Sept. 20, 1971

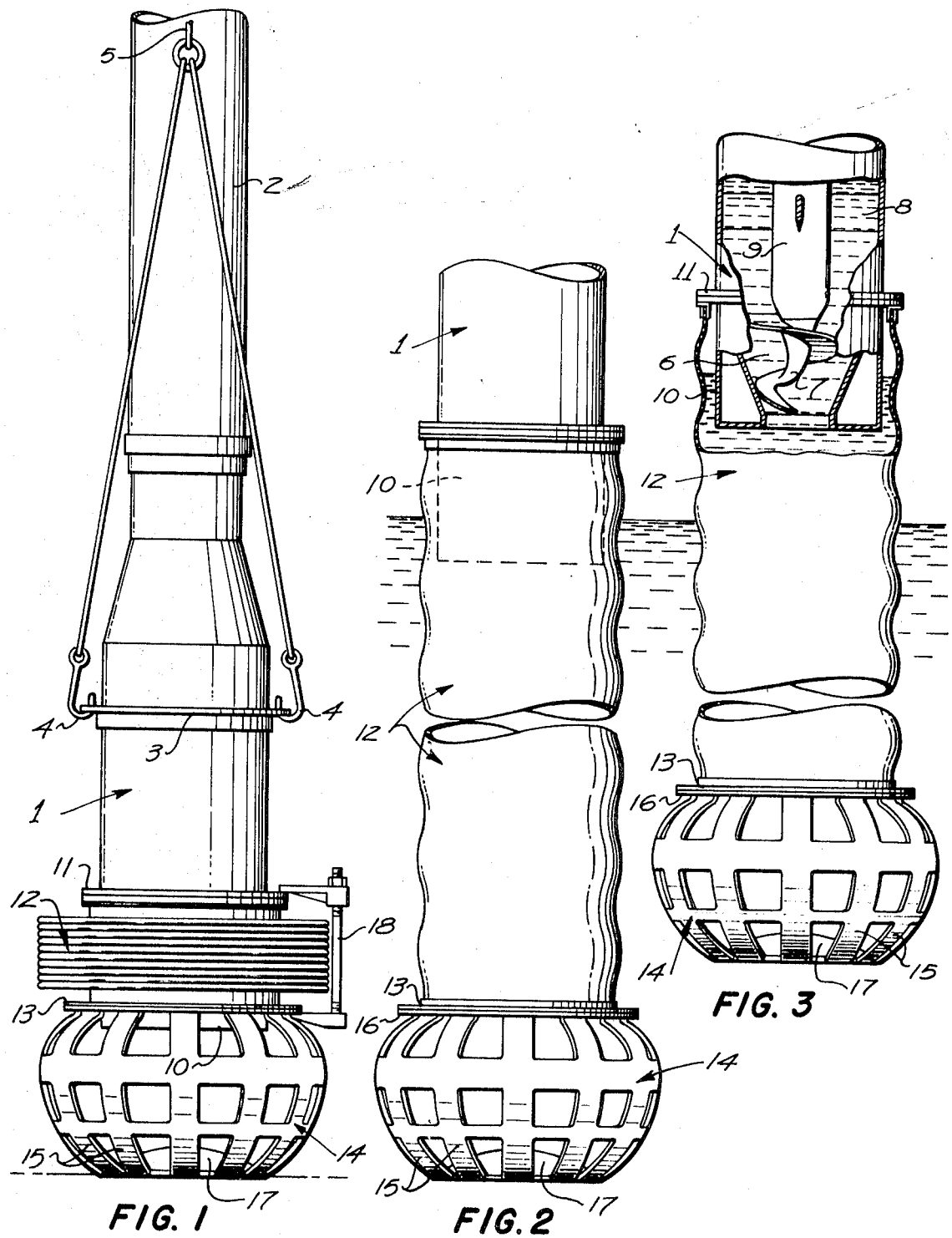

3,606,567
TRANSPORTING APPARATUS FOR SOLIDS-LIQUID MIXTURES
Martin Stähle, % Hidrostal, S.A., Avda Argentine 2842, Lima, Peru
Filed Nov. 13, 1969, Ser. No. 876,466
Int. Cl. F01b 25/00
U.S. Cl. 415—47
9 Claims

ABSTRACT OF THE DISCLOSURE

An apparatus which utilizes a suction pump designed to pass a solids-liquid mixture with minimal damage to the solids and an extensible tube terminating in a weighted strainer capable of passing solids which will pass the pump; the depth of submergence being variable depending on the suction pressure produced by the pump whereby on encountering excess solids content the tube and strainer raises automatically to a less dense region, and on reduction in solids content, extends automatically to a lower level.

BACKGROUND OF THE INVENTION

The present invention relates to pumping apparatus for transportation of a mixture of liquid and solids; for example, the transportation of fish from a fish net to a boat, or from a boat hold to a shore storage facility. The apparatus is also applicable to the handling of vegetables, fruits or any solids which may be contained in water, waste water or other liquid.

Apparatus of this type usually involves the use of a submersible pump having an adjacent inlet end. The inlet end is moved continuously, both vertically and laterally, in the mixture to avoid excessive concentration of solids at the inlet end. It is conventional practice to accomplish this manually and it requires continued alertness on the part of the operator, otherwise high concentration of solids at the inlet or suction end will damage the solids.

SUMMARY OF THE INVENTION

The present invention avoids the aforementioned disadvantages and is summarized in the following objects:

First, to provide a transporting apparatus for solids-liquid mixtures wherein a pump capable of passing solid material with minimal damage is equipped with a readily extensible and retractable inlet tube, terminating in a strainer capable of passing solids dimensioned to pass the pump, the inlet tube tending to retract or raise in the liquid should the solids concentration tend to increase and to lower should the concentration decrease, thereby minimizing the surveillance required of the operator.

Second, to provide a transporting apparatus, as indicated in the preceding object, which may utilize as a pump the construction shown in a previous patent, No. 3,156,190, but is not limited thereto.

Third, to provide an apparatus of the type indicated wherein the extensible tube is corrugated, capable of collapsing to a short axial length, and readily secured in such contracted condition to facilitate storage and transportation of the apparatus when not in use.

DESCRIPTION OF THE DRAWINGS

FIG. 1 is a partial sectional, partial elevational view of the transporting apparatus for solids-liquid mixtures, the apparatus being shown in its retracted or storage condition.

FIG. 2 is a similar partial sectional, partial elevational view, with the intake tube shown fragmentarily, and the apparatus shown in priming condition with the pump impeller partially submerged.

FIG. 3 is another partial sectional, partial elevational view, showing the parts in their normal working condition.

The transporting apparatus for solids-liquid mixtures includes a cylindrical pump housing 1, tapered at its upper end for connection to an outlet hose 2. Near its upper end, the pump housing is provided with a suspension collar 3, adapted to receive a pair of hooks 4 for attachment to a suspension line 5.

The lower portion of the pump housing is internally tapered to form an impeller chamber 6, which receives an impeller 7. As it is intended that the apparatus be employed to pump a solids-liquid mixture, the impeller is so designed as to avoid or at least minimize damage to the solid material even though such material be fragile. Consequently, the impeller may be of the type disclosed in Pat. No. 3,156,190. Mounted above the impeller by means of appropriate struts 8, is a motor housing 9, containing a motor attached to the impeller. The motor and its attachment is conventional and may be a hydraulic or electric motor.

The impeller chamber 6 is enclosed in a cylindrical sleeve 10, provided at its upper end, which may coincide with the upper end of the impeller chamber, with a mounting flange 11. Attached to the mounting flange is an inlet hose 12. The inlet hose is corrugated, the corrugations being capable of folding upon themselves so that when retracted, the inlet hose has minimal axial length. The extended end of the inlet hose is provided with a strainer supporting flange 13, capable of fitting slidably over the sleeve 10.

Attached to the flange 13 is a strainer 14 in the form of a basket having curved ribs 15, joined at their upper ends to a ring 16, which in turn is secured to the flange 13, and joined at their lower ends to a cupped plate 17. The spacing between the ribs 15 is comparable to or a little smaller than the inlet opening to the impeller chamber 6 occupied by the impeller 7, so that any solid object capable of passing between the ribs 15 will also pass the impeller 7 and the annular space between the pump housing and the motor housing.

For purposes of storing or transporting the apparatus, the inlet hose 12 may be secured in its contracted position by a set of clamps 18 adapted to overlie the flanges 11 and 13 or engage the ring 16.

Operation of the transporting apparatus for solids-liquid mixtures is as follows:

As indicated previously, the apparatus is intended for the removal of fish from within a net for transfer to the hold of a fishing vessel, or for removal of the fish from the hold to an appropriate container. However, the apparatus may be used in the handling of fruits or vegetables which are suspended in water or other liquid media.

Referring primarily to the use of the apparatus in the handling of fish, the clamps 18 are first removed and the inlet hose 12 submerged, as shown in FIG. 2, until the impeller is submerged sufficiently to be primed. The impeller is then operated, drawing the liquid or water upwardly through the inlet hose 12 for discharge through the outlet hose 2. Solid material, such as fish, and of such dimension as to pass through the strainer 14, is carried upwardly in the hose 12 with the water, and passes through the impeller 7. If the strainer 14 is exposed to a high concentration of fish, there will be tendency of the mass of fish to partially seal the strainer, causing the strainer 14 to raise and the inlet hose 12 to retract as the water in the inlet hose is drawn upwardly by the propeller. The concentration of fish tends to increase with depth so that raising the strainer moves the strainer into a region having lower fish concentration. The strainer continues to raise until a condition of equilibrium is reached. This is accomplished automatically without manual effort. Should the concentration of fish diminish, the strainer automatically lowers until a new condition of equilibrium is reached.

Under normal working conditions, the impeller need not be submerged below the external liquid level; however, the pump is capable of operating whether it be submerged or whether it be located above the external liquid level.

The present embodiment of this invention is to be considered in all respects as illustrative and not restrictive.

I claim:

1. A transporting apparatus for solids-liquid mixtures, comprising:
   (a) a pump adapted to pass a solids-liquid mixture;
   (b) an inlet structure depending from the pump for submergence in the liquid;
   (c) and means responsive to increased suction pressure at the inlet end of the structure to raise the inlet end thereof and responsive to decreased suction pressure at the inlet end of the structure to lower the inlet end thereof.

2. An apparatus, as defined in claim 1, wherein:
   (a) said means is a longitudinally extensible and retractable member incorporated in the inlet structure;
   (b) and weight means is provided at the lower end of the inlet structure tending to extend the member.

3. An apparatus, as defined in claim 1, wherein:
   (a) said means is a corrugated hose incorporated in the inlet structure and movable between a retracted position, wherein the corrugations fold upon each other, and an extended position;
   (b) and a combination weight and strainer means is provided at the lower end of the hose, tending to extend the hose and to restrict the size of solids admitted to those capable of passing the pump.

4. An apparatus, as defined in claim 3, which further comprises:
   (a) clamp means for securing the hose in its contracted position.

5. A transporting apparatus for solids-liquid mixtures, comprising:
   (a) a pump adapted to pass a liquid mixture containing solids below a particular maximum size;
   (b) a discharge tube extending upwardly from the pump;
   (c) an extensible and retractable inlet tube depending from the pump;
   (d) a strainer at the lower end inlet tube dimensioned to pass solids capable of passing through the pump, the inlet tubing being operable in response to increased suction pressure resulting from partial closure of the screen by the solids to retract to a region of fewer solids, and being operable on decrease of the suction pressure to extend to a region of greater solids.

6. An apparatus, as defined in claim 5, which further comprises:
   (a) a supporting means moving the pump between at least a partially submerged position and a raised position.

7. An apparatus, as defined in claim 5, which further comprises:
   (a) clamp means for securing the inlet tube in its fully retracted position.

8. A transporting apparatus for solids-liquid mixtures, comprising:
   (a) a pump including an impeller adapted to pass with minimal damage liquid suspended solids below a selected size;
   (b) a corrugated inlet hose secured to the pump and movable between a retracted position surrounding and supported by the pump and an extended position depending from the pump;
   (c) strainer and weight means at the lower end of the inlet hose adapted to fit over the lower end of the pump when the inlet hose is retracted and forms a supporting base therefor;
   (d) said pump being operable, when the strainer is exposed to an excess concentration of solids, to produce reduced pressure in the inlet hose tending to contract the hose and raise the strainer into a region of lesser concentration of solids, and the pump also being operable, when the strainer is exposed to a reduced concentration of solids to extend the hose and lower the strainer into a region of greater concentration of solids.

9. An apparatus, as defined in claim 8, which further comprises:
   (a) a clamp means engageable with the pump and strainer to secure the hose in its contracted position and the strainer in its supporting position.

References Cited

UNITED STATES PATENTS

| | | | |
|---|---|---|---|
| 2,407,748 | 9/1946 | Schmidt | 415—72 |
| 3,156,190 | 11/1964 | Stahle | 415—72 |
| 3,163,229 | 12/1964 | Salisbury | 415—121 |
| 3,270,677 | 9/1966 | Eller et al. | 415—215 |

CORNELIUS J. HUSAR, Primary Examiner

U.S. Cl. X.R.

415—72, 215